US006740260B2

(12) United States Patent
McCord

(10) Patent No.: US 6,740,260 B2
(45) Date of Patent: May 25, 2004

(54) TUNGSTEN-PRECURSOR COMPOSITE

(76) Inventor: Stuart James McCord, 10 Jarvis Way, Westford, MA (US) 01886

( * ) Notice: Subject to any disclaimer, the term of this patent is extended or adjusted under 35 U.S.C. 154(b) by 0 days.

(21) Appl. No.: 10/095,350

(22) Filed: Mar. 9, 2002

(65) Prior Publication Data

US 2003/0168637 A1 Sep. 11, 2003

(51) Int. Cl.[7] .............................. G21F 3/00; B32B 5/00; C08K 3/10

(52) U.S. Cl. .................... 252/511; 252/515; 252/520.5; 250/505.1; 250/515.1; 250/519.1; 264/331.11; 428/327; 428/328; 523/137

(58) Field of Search ................................ 252/500, 511, 252/512, 515, 520.5, 508; 250/505.1, 515.1, 519.1; 264/109, 239, 297.1, 331.11; 164/175; 425/563; 75/248; 428/546, 327, 328; 523/137

(56) References Cited

U.S. PATENT DOCUMENTS 4,619,963 A 10/1986 Shoji et al.
4,957,943 A * 9/1990 McAllister et al. ........... 521/64
5,360,666 A 11/1994 Eichmiller
5,548,125 A * 8/1996 Sandbank ................ 250/519.1
5,730,664 A 3/1998 Asakura et al.
6,048,379 A 4/2000 Bray et al.
6,166,390 A 12/2000 Quapp et al.
6,310,355 B1 10/2001 Cadwalader

* cited by examiner

*Primary Examiner*—Yogendra N. Gupta
*Assistant Examiner*—Kallambella M. Vijayakumar
(74) *Attorney, Agent, or Firm*—Barber Legal; Craig W. Barber

(57) ABSTRACT

A tungsten-precursor composite having a polymer matrix and a tungsten precursor therein. The tungsten precursor may be tungsten oxide, ammonium paratungstate, ammonium metatungstate or other precursor or combination of tungsten precursors. The polymer may be any of a very wide range of materials or combinations thereof. Binder, secondary fillers or other third components may be added. By means of use of various tungsten precursors, polymers, and third components, the physical, radiological and electrical properties of the finished products may be tailored to achieve desired properties. In addition, the invention teaches that radiation shielding, insulators, and combined radiation shield/insulators may be fashioned from the composite. A wide range of production methods may be employed, including but not limited to liquid resin casting.

16 Claims, 4 Drawing Sheets

TUNGSTEN-PRECURSOR COMPOSITE

FIELD OF THE INVENTION

This invention relates to generally to polymer-metal-precursor composites and particularly to a polymer-metal-precursor composite in which the metal-precursor component is a tungsten precursor.

BACKGROUND OF THE INVENTION

X-ray and gamma ray sources are presently being used in a wide array of medical and industrial machinery, and the breadth of such use expands from year to year. Consumer tend to notice medical and dental X-ray machines, but in addition to these applications there are baggage screening machines, CAT scan machiness, non-destructive industrial inspection machinery and ion implantation machines used in the manufacture of silicon wafer computer chips. All require that radiation be contained and directed.

In the past, lead itself or lead-polymer composites were used to make such items. But there are numerous problems with the use of lead. One problem with lead is that it is toxic and thus subject to increasingly stringent legal controls. Another issue is that lead may not have the mechanical or electrical properties desired for a given application. Lead has been used in various forms in wide range of applications: machined, as a solid casting, as a solid encased within a matrix such as a polymer matrix, or as a filler. As a filler, it may be lead particles, tribasic lead-sulfate or lead-oxide particles or particles of a specified shape or size, or as a mixture with other materials such as tin. Tungsten shielding, or polymer-tungsten shielding has also been used. Examples of all of these methods may be found in the prior art.

Polymer-metal composite materials are of increasing importance in radiation technology and a number of industries, due to the fact that polymer-metal composite materials offer characteristics which are difficult or impossible to match in other materials of equivalent price or ease of manufacture.

In general, polymer-metal composites are materials having a polymer matrix containing particles of a metal compound intermixed therein. The polymer may advantageously have plastic properties allowing for ease of manufacture, but a wide variety of polymers are known for use in such composites. The choice of metal will place undesirable limitations on the range of properties which may be provided to the manufactured composite. In general, high density and accompanying factors such as increased mass, increased radiological shielding properties, heat-deflection properties, impact strength, tensile strength and so on. In the prior art, lead has been a particularly favored material for its density and ease of working. Tungsten has been favored more recently. Three characteristics in particular which make such materials desirable are electrical non-conductivity, radiological shielding ability, and high density.

There is a growing list of applications for which polymer-metal composite materials are either required or advantageous. Reactor shielding, ion implantation machine source insulators, X-ray tube housings, radioisotope housings, syringe housings, body shielding, dental X-ray packets ("bitewings"), containers, other castings and housings all benefit from the properties of polymer-metal composite materials. In the case of typical high voltage insulators for ion implantation machinery, a thick walled generally round or cylindrical part is created out of lead or polymer-lead-oxide ranging from an inch to several feet or more in long dimension and weighing anywhere up to 500 pounds. Wall thickness may range from ½ inch to several inches. Such parts must resist high voltages, shield against x-ray or gamma ray emission and hold a high vacuum state when connected to the vacuum chamber. X-ray tube shielding is generally thinner (often 0.070 inch thickness), generally smaller, and of different shape, having an aperture for the X-ray beam, but once again must offer high voltage insulation and radiation protection. The lead in such devices obviously presents an environmental challenge to manufacture, use and disposal.

In the processing of lead precursor filled plastics known in the art, specialized facilities, handling procedures, training and safety equipment must be used to protect the employees from the lead precursor they handle. Lead-based dust is a particular concern, being airborne and inhalable. Such dust may be generated during mixing, molding, deflashing, machining and finishing of final products such as insulators or shields, to say nothing of earlier stages of mining, smelting and refining of lead and the final disposal of the used product at the end of its useful life. Even during the life span of the product, it is illegal to sand, machine, alter or use the product in any way that will generate dust. All such processes must be carried out at special lead handling sites, and all waste dust from any of these processes must be collected in accordance with OSHA regulations and transported to hazardous waste land fills in accordance with OSHA and DES guidelines.

Internalized by law into the manufacturing process, such safety issues dramatically increase the cost of such products, which in turn increases other medical or industrial costs.

One attempt to deal with the issue of environmental lead contamination may be found in U.S. Pat. No. 6,048,379 issued Apr. 11, 2000 to Bray et al for "HIGH DENSITY COMPOSITE MATERIAL". This patent teaches the use of tungsten powder, a binder and a polymer to provide a composite material offering a density high enough for use as ammunition. As stated in that patent's "Description of Related Art", "The density of the projectile should be close to that of a lead projectile for realistic performance simulation. Materials of a lower density decrease projectile range and penetration." Thus this patent teaches towards higher density materials. In addition, tungsten is electrically conductive and thus tungsten composite mixes do not provide any significant electrical insulation. Another serious issue with the use of tungsten is that of cost. Tungsten metal is quite expensive in comparison to lead. For example, tungsten-composite materials may cost as much as 20$ per pound.

U.S. Pat. No. 5,730,664, U.S. Pat. No. 5,719,352, and U.S. Pat. No. 5,665,808, respectively issued to Asakura, Griffin, Bilsbury all disclose metal-polymer composites for projectiles, respectively golf balls and shot pellets. Other patents from the same art (projectiles) also propose non-toxic materials.

In the radiation shielding art itself, various patents propose polymer-metal composites of various forms.

EcoMASS (a registered trademark of the PolyOne Corporation) is a combination of tungsten metal and nylon and elastomer compounds used for shielding, apparently based upon the Bray '379 patent related to ammunition and thus developed specifically in response to military/sporting needs for non-toxic ammunition. It does not teach that materials other than tungsten may be used, thus limiting the range of characteristics of the final product. For example, tungsten is electrically conductive and thus is not normally suitable for insulators. As mentioned earlier, this material also faces cost limitations. In addition, this material has manufacturing limitations in terms of thickness and size of the final item.

U.S. Pat. No. 4,619,963 issued Oct. 28, 1986 to Shoji et al for "RADIATION SHIELDING COMPOSITE SHEET MATERIAL" teaches a lead-tin fiber and resin shield, as does U.S. Pat. No. 4,485,838 issued Dec. 4, 1984 to the same inventors.

U.S. Pat. No. 6,310,355 issued Oct. 30, 2001 to Cadwalader for "LIGHTWEIGHT RADIATION SHIELD SYSTEM" teaches a flexible matrix having a radiation attenuating material and at least one void.

U.S. Pat. No. 6,166,390 issued Dec. 26, 2000 to Quapp et al for "RADIATION SHIELDING COMPOSITION" teaches a concrete composite material.

U.S. Pat. No. 5,360,666 issued Nov. 1, 1994 and U.S. Pat. No. 5,190,990 issued Mar. 2, 1993 to Eichmiller for "DEVICE AND METHOD FOR SHIELDING HEALTHY TISSUE DURING RADIATION THERAPY" teach a radiation shield for the human body comprising an elastomeric material and certain mixtures (see the summary of the invention) of various metals in the form of spherical particles.

SUMMARY OF THE INVENTION

General Summary

The present invention teaches a novel family of lead-free plastic materials that may act as replacements for lead or lead oxide filled plastics, particularly in the role of radiation shields and insulators. The present invention teaches a polymer-tungsten-precursor composite comprising a plastic matrix having high density tungsten precursor materials within it as "filler". By tungsten precursors are meant raw materials used in the manufacture of tungsten including but not limited to tungsten oxide, ammonium paratungstate (APT), ammonium metatungstate (AMT), etc. Tungsten precursors have a reduced electrical conductivity and thus tungsten-precursor composites allow the manufacture of insulators. Such tungsten-precursors may range in price from ⅓ to ⅔ the cost of tungsten metal, thus decreasing price of the final product, yet may contain over 80% of the tungsten of tungsten metal, thus offering a commercial benefit: tungsten-precursors may be advantageously manufactured for 8$ per pound.

The present invention further teaches that by use of a number of such tungsten-precursors the range and breadth of the material characteristics which may be achieved is expanded. This flexibility allows a wider range of function and use when compared with previous methods using a single metal or a single metal and polymer composite.

The present invention further teaches the use of binders, fibers, and secondary fillers in the polymer-tungsten-precursor composite in order to further broaden the range of achievable desirable physical, radiological and/or electrical properties.

Summary in Reference to Claims

The present invention in the presently preferred embodiment and best mode presently contemplated for carrying out the invention teaches a radiation shield material comprising: a polymer matrix and a tungsten-precursor within the polymer matrix.

In further embodiments, the invention teaches a radiation shield material wherein the tungsten precursor comprises at least one member selected from the following group: ammonium paratungstate, ammonium metatungstate, blue tungsten oxide, yellow tungsten oxide and combinations thereof.

In further aspects, the present invention teaches a radiation shield material wherein the tungsten precursor comprises tungsten oxide in an amount ranging from approximately 80% to approximately 99.9% of the total weight of the tungsten precursor.

It is one objective of the present invention to teach a radiation shield material wherein the tungsten precursor comprises an amount by volume approximately ranging from 5% to 95%, preferably 10% to 50% of the total composite volume.

The present invention further teaches a radiation shield material wherein the polymer matrix comprises at least one member selected from the following group: thermosetting material, thermoplastic material and combinations thereof.

The present invention further teaches a radiation shield material wherein the polymer matrix comprises at least one member selected from the following group: epoxy, polyester, polyurethane, silicone rubber, bismaleimides, polyimides, vinylesters, urethane hybrids, polyurea elastomer, phenolics, cyanates, cellulose, flouro-polymer, ethylene inter-polymer alloy elastomer, ethylene vinyl acetate, nylon, polyetherimide, polyester elastomer, polyester sulfone, polyphenyl amide, polypropylene, polyvinylidene florid, acrylic, homopolymers, acetates, copolymers, acrylonitrile-butadiene-styrene, flouropolymers, ionimers, polyamides, polyamide-imides, polyacrylates, polyether ketones, polyaryl-sulfones, polybenzimidazoles, polycarbonates, polybutylene, terephthalates, polyether sulfones, thermoplastic polyimides, thermoplastic polyurethanes, polyphenylene sulfides, polyethylene, polypropylene, polysulfones, polyvinylchlorides, styrene acrylonitriles, polystyrenes, polyphenylene, ether blends, styrene maleic anhydrides, allyls, aminos, polyphenylene oxide, and combinations thereof.

The present invention has a further advantage in teaching a radiation shield material wherein the polymer matrix comprises epoxy resin in an approximate amount of 55% by volume and further wherein the tungsten precursor comprises blue tungsten oxide powder in an approximate amount of 45% by volume.

The present invention further has as one aspect the teaching of a radiation shield material further comprising a third material.

The present invention further teaches alternative embodiments of a radiation shield material wherein the third material comprises at least one member selected from the following group: electrically insulating materials, binders, high density materials and combinations thereof.

In embodiments, the present invention teaches a radiation shield material wherein the third material comprises at least one member selected from the following group: tungsten metal, calcium carbonate, hydrated alumina, tabular alumina, silica, glass beads, glass fibers, magnesium oxide, wollastonite, stainless steel fibers, copper, carbonyl iron, iron, molybdenum, nickel and combinations thereof.

The present invention yet further teaches a radiation shield material wherein the third material comprises an amount by volume approximately ranging from 5% to 95%, preferably 10% to 30% of the total composite volume.

The present invention further teaches a radiation shield material wherein the polymer matrix comprises epoxy resin in an approximate amount of 64% of the total composite volume, and further wherein the tungsten precursor comprises blue tungsten oxide powder in an approximate amount of 16% by volume, and further wherein the third component comprises hydrated alumina in an approximate amount of 20% by volume.

In another embodiment, the present invention teaches a radiation shield comprising the material of claim 1.

In another embodiment, the present invention teaches that the radiation shield is used as an ion source insulator.

It is a further embodiment, advantage, aspect and objective of the present invention to teach a radiation shield comprising a body comprising a polymer matrix and a tungsten precursor within the polymer matrix.

The present invention further teaches a radiation shield wherein the body has a shape selected from the following group: generally annular bodies, generally cylindrical bodies, three dimensional conic sections, regular prisms, irregular prisms and combinations thereof.

The present invention further teaches that the radiation shield may be utilized as an ion source insulator.

The present invention further teaches a method of making a radiation shield comprising combining a tungsten precursor and a polymer into a composite; and forming the composite into a desired shape.

The present invention further teaches a method wherein the step of forming the composite into the desired shape further comprises one member selected from the following group: casting, molding, machining, extrusion, aggregation, liquid resin casting, injection molding, compression molding, transfer molding, pultrusion, centrifugal molding, calerendering, filament winding and combinations thereof.

DETAILED DESCRIPTION

Figure 1:
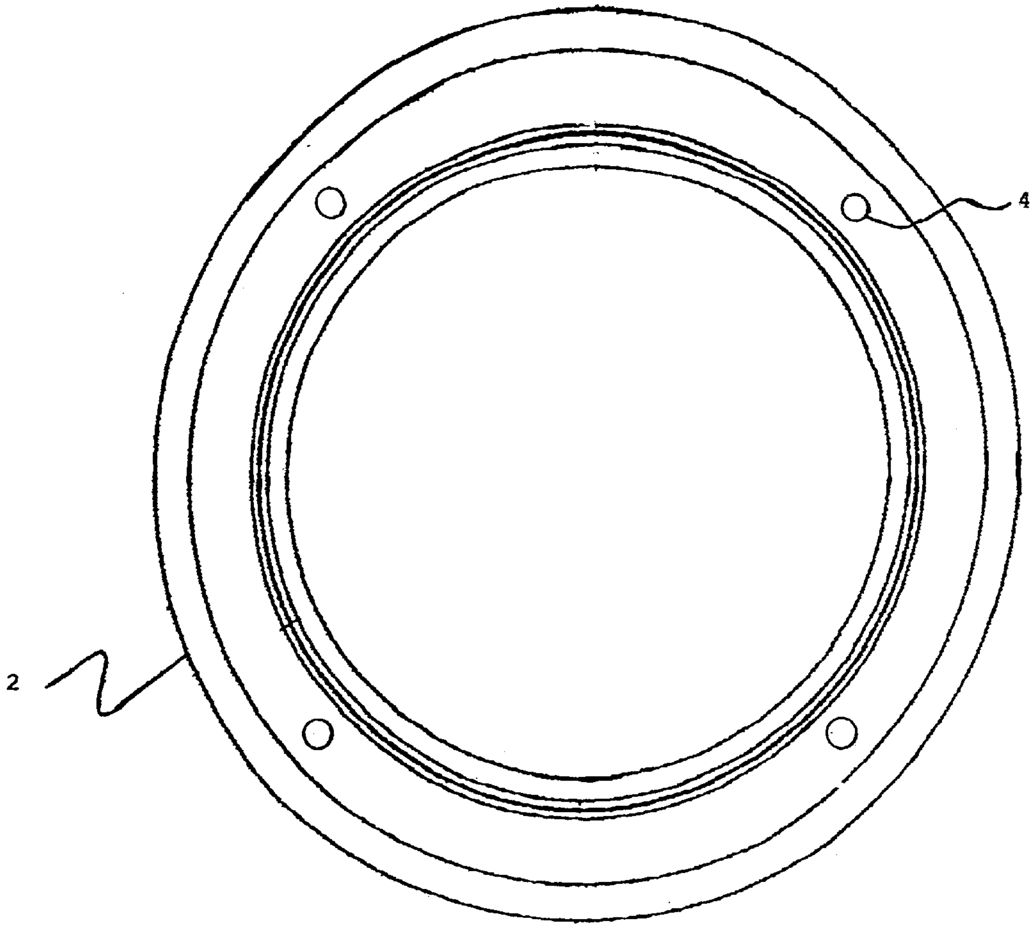
FIG. 1 is a perspective view of a first embodiment of an ion source insulator according to the present invention.

The present invention teaches a novel family of lead-free plastic materials that may act as replacements for lead or lead oxide filled plastics, particularly in the role of radiation shields and insulators. The presently preferred embodiment and best mode presently contemplated of the invention teaches a polymer-tungsten-precursor composite comprising a high density plastic matrix having tungsten precursor materials within it as "filler". By tungsten precursors are meant raw materials used in the manufacture of tungsten including but not limited to tungsten oxide, ammonium paratungstate (APT), ammonium metatungstate (AMT), etc. This list is exemplary, not exhaustive.

By teaching the use of a range of tungsten-precursors instead of a single metal such as lead, or a single metal-polymer combination, the breadth of the properties which may be achieved is increased, another benefit of the invention. In particular, when compared to tungsten-composites:

a) Tungsten precursors consist of tungsten atoms combined with additional atoms or molecules which reduce the electrical conductivity of the material and the electrical conductivity (impedance) of the tungsten-precursor composite in comparison to tungsten-composites. For example, tungsten oxides contain oxygen atoms, ammonium paratungstate contains an ammonia/ammonium molecule ($NH_3$, $NH_4$), and other tungsten precursors have the same or other additional elements/molecules with corresponding effects upon conductivity/resistivity.

b) Tungsten precursors offer commercial advantages over tungsten metal. While a tungsten-composite may cost 20$ per pound to manufacture, a tungsten-precursor composite may cost only 8$ per pound to manufacture. However, tungsten precursors may contain 80% or more tungsten, thus offering shielding which is comparatively commercially advantageous.

c) Tungsten precursors are less dense than tungsten metal. For ammunition centered applications this is extremely undesirable, as mass is desirable for ammunition. Similarly, for shielding applications higher density is normally considered desirable; migrating to the use of a less dense material is not a usual consideration. However, when a 0.070 inch thick tungsten wall meets the design application, a 0.140 inch wall of tungsten precursor can get the job done at a more producible wall thickness.

Tungsten oxides (for example, $WO_2$ and $WO_3$, respectively known as blue and yellow tungsten oxide) is a naturally occurring material used in the manufacture of tungsten. Significantly for the purposes of the present invention, tungsten oxide has lower density and less electrical conductivity than pure tungsten metal. These properties present distinct improvements in the X-ray and gamma ray source shielding area, in which electrical conductivity is a disadvantage. Ammonium paratungstate and ammonium metatungstate (respectively $5(NH_4)_2O.12WO_3.5H_2O$ and $3(NH_4)_2O.12WO_3.XH_2O$) may also be advantageously employed, as may a range of other tungsten precursors. Ammonium paratungstate has a $WO_3$ content of 88.5%, the $WO_3$ of ammonium metatungstate obviously depends upon the water content. In the case of the ammonium tungstate precursors, removal of the ammonia groups generates $WO_3$, and this same process may be used with other tungsten precursors, or the additional groups may be used in the composite.

The present invention may be manufactured with thermosetting materials and/or thermoplastic materials.

The polymers, plastics and resins which may be advantageously employed in the present invention are too numerous for a complete list, however, a partial and exemplary list includes epoxy, polyester, polyurethane, silicone rubber, bismaleimides, polyimides, vinylesters, urethane hybrids, polyurea elastomer, phenolics, cyanates, cellulose, flouro-polymer, ethylene inter-polymer alloy elastomer, ethylene vinyl acetate, nylon, polyetherimide, polyester elastomer, polyester sulfone, polyphenyl amide, polypropylene, polyvinylidene flouride, acrylic, homopolymers, acetates, copolymers, acrlonitrile-butadiene-stryene, flouropolymers, ionimers, polyamides, polyamide-imides, polyacrylates, polyether ketones, polyaryl-sulfones, polybenzimidazoles, polycarbonates, polybutylene, terephthalates, polyether sulfones, thermoplastic polyimides, thermoplastic polyurethanes, polyphenylene sulfides, polyethylene, polypropylene, polysulfones, polyvinylchlorides, stryrene acrylonitriles, polystyrenes, polyphenylene, ether blends, styrene maleic anhydrides, allyls, aminos, and polyphenylene oxide. Numerous variations and equivalents are possible.

The invention is not limited to a single matrix component and a single tungsten-precursor, on the contrary multiple components may be included, for example, copolymers may be used or other mixtures of matrix elements. As another example, in tailoring of the physical properties of the composition, a blend of more than one tungsten-precursor (such as a blend of different tungsten oxides) may be used.

In addition, the invention supports addition to the mixture of secondary fillers, binders, fibers and other components. As examples, electrically insulating materials, strengthening materials, materials to provide a uniform composition or bind other components, and/or density increasing materials may be used. A more specific list of examples includes such materials as tungsten metal, calcium carbonate, hydrated alumina, tabular alumina, silica, glass beads, glass fibers, magnesium oxide, wollastonite, stainless steel fibers, copper, carbonyl iron, steel, iron, molybdenum, and/or nickel.

In addition, the composite material of the present invention is susceptible to a wide range of processing methods both for creation of the material and creation of items incorporating the material. Casting, molding, aggregation, machining, liquid resin casting, transfer molding, injection molding, compression molding, extrusion, pultrusion, centrifugal molding, calerending, filament winding, and other methods of handling are possible. Additionally, the composite of the invention may advantageously be worked with known equipment such as molds and machine tools, thus avoiding costs associated with re-equipping production facilities. Furthermore, since the material contains no lead, significant cost and time savings may be realized and burdensome regulations regarding lead may be properly avoided during these processes.

In theory, the material may be substituted for lead shielding on a basis of approximately 2 to 1. Thus, for typical lead shielding of 0.070 inches thickness, a replacement may be manufactured of 0.140 inches thickness. In the case of liquid resin casting, this increased thickness further allows easier molding.

High voltage electrical insulators (such as those on ion beam implantation devices or other ion beam sources, i.e. insulators which also serve as radiation shields) are typically bulky, which leads to excessive weight. Reducing the amount of metal in such metal-composites tends to lead to uneven distribution of the shielding component within the overall matrix of polymer. However, the present invention helps to solve this problem also. By making the material used in the manufacture of the shield/insulator less dense rather than more dense, the weight can be greatly reduced, yet adequate and evenly distributed radiological shielding ability may be maintained.

EXAMPLE I

A first formulation and embodiment of the invention was derived from blue tungsten oxide. The formulation comprised 64% by volume of an epoxy resin (438 Novolac/HHPA curative, a trademark and product of the Dow Corporation), 16% blue tungsten oxide and 20% hydrated alumina. 12 inch square plates of 0.25 inch thickness were vacuum cast and examined. Test panels were machined from the plates.

The cast plate was of good quality.

Machined panels were of good quality.

Material density was 0.104 lb/cubic inch.

Shielding effectiveness was 12% of equivalent lead metal.

Surface resistivity was 10 to the $12^{th}$ Ohms per square.

Arc resistance was 150 seconds (Tested using ASTM D495)

Dielectric Constant was 16.7 @ 1 KHz (Tested using ASTM D150)

Dissipation Factor was 0.030 @ 1 KHz (Tested using ASTM D150)

Unexpectedly, the X-ray shielding effectiveness was equal to the same density of lead oxide filled epoxy but the arc resistance was approximately doubled.

EXAMPLE II

A second formulation and embodiment of the invention was derived using APT (Ammonium Paratungstate) as the filler. 65% epoxy resin (the same material as the first test) served as matrix for 35% APT, both measures by volume. Once again, a 12 inch by 12 inch plate of ¼ inch thickness was cast and examined. Test panels were machined therefrom The cast plate was of good quality Machined panels were of good quality.

X-ray shielding was 25% of lead metal

Surface resistivity was 10 to the $10^{th}$ Ohms/square

This material shows promise but needs more testing.

EXAMPLE III

A third formulation and embodiment of the invention was derived using blue tungsten oxide to generate a radiation shielding material suitable for replacement of lead sheet. The material is also formulated to be processed in conventional vacuum casting equipment. This embodiment comprised 55% by volume of epoxy resin (the same material as the first two examples) with a filling of 45% by volume blue tungsten oxide in powder form. A square sheet 12 inches on each side was once again cast; thickness was once again 0.25 inch. Test panels were machined therefrom.

The cast was of good quality.

Machined panels were of good quality.

Material density was 0.210 lb/cubic inch.

X-ray shielding effectiveness was >50% lead metal

Surface resistivity was 10 to the $4^{th}$ ohms/square

Cost of production of this material was comparatively very low.

In summary of the test results, it can be seen that for applications requiring high resistivity and high arc resistance, tungsten-precursor composites may be advantageously used to achieve the desired properties. While the three tests all utilized epoxy resin, the present invention is not so limited, neither to the specific epoxy resin used nor to epoxy resin in general. Applicant reiterates that the three examples presented are only examples: further development will produce numerous other materials with a wide range of characteristics, components, and methods of production.

One example of an application of the composite is presented below, that of a ion implantation device source insulator, though the invention is not so limited.

It can also be seen that for applications requiring high shielding ability (such as X-ray source shielding in the medical field) the invention may be formulated to provide a shielding ability sufficient for lead replacement.

Without undue experimentation higher density formulations may be produced on demand by mixing additional secondary fillers into the composition. Alternatively, the tungsten oxide volumetric percentage may be increased by use of injection molding, compression molding or transfer molding. As demonstrated by the example using hydrated alumina, other properties such as electrical resistivity/ conductivity, workability, ductility, density, and so on may also be adjusted by use of secondary fillers, binders, and other agents in the composition.

Thus it is apparent that a wide variety of products may be produced, as the characteristics of the tungsten-precursor composite of the present invention may be tailored depending upon the desired end characteristics. In addition, the environmental contamination engendered by the product is of a different order of magnitude than that produced by products containing lead.

End Products

An exemplary list of embodiments which may advantageously be produced using the material of the present invention includes X-ray tube insulators, apertures and enclosures, X-ray tube high-voltage insulators and enclosures, X-ray tube high voltage apertures, X-ray tube high voltage encapsulation devices, radioactive shielding containers and other medical X-ray and gamma ray housings. Industrially, an exemplary list of embodiments in which the composition of the invention may advantageously be incorporated include ion source insulators for ion implantation machinery and other devices for insulating, isolating, directing or shielding any radiation producing device. As stated, these lists are exemplary only and embodiments of the invention may be utilized within the art field of radiation shielding in a broad range of equivalent ways.

One example embodiment of the device is depicted in the figures: an ion source high voltage insulator.

FIG. 1 is a perspective view of an embodiment of an ion source insulator according to the present invention. Ion source insulator 2 is generally annular in shape so as to allow to pass therethrough an ion implantation beam such as those used in the creation of microchip wafers. Such a device may advantageously have a desirable combination of radiation shielding ability, electrical resistivity/conductivity, physical parameters and other characteristics as are allowed by use of the polymer-tungsten-precursor composite of the present invention.

In use, the device may be placed directly against the ion source and/or may be placed around the ion stream at later points, for example, after magnetic devices which may focus, redirect or otherwise alter the ion beam, or in any other location in which radiation or electrical charges may need to be blocked.

Figure 2:
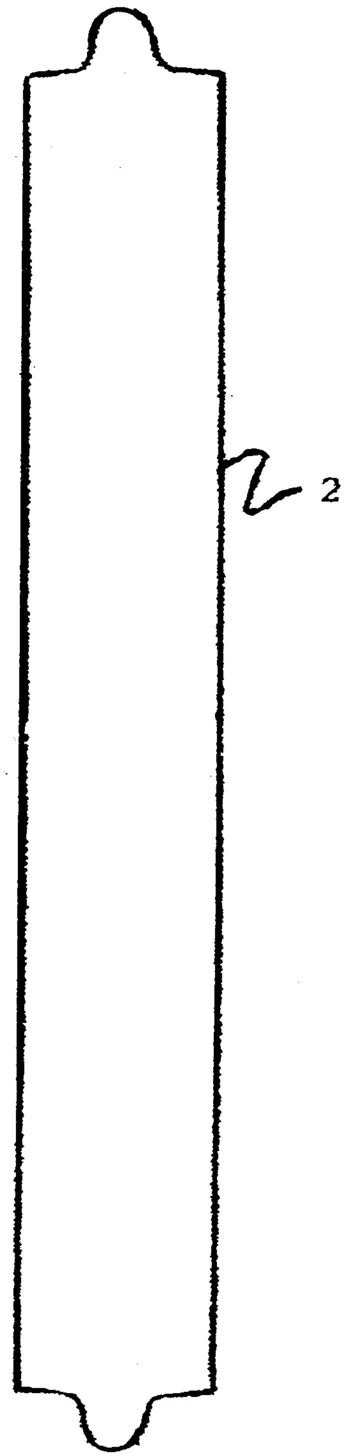
FIG. 2 is a side view of the first embodiment of the ion source insulator.
Figure 3:
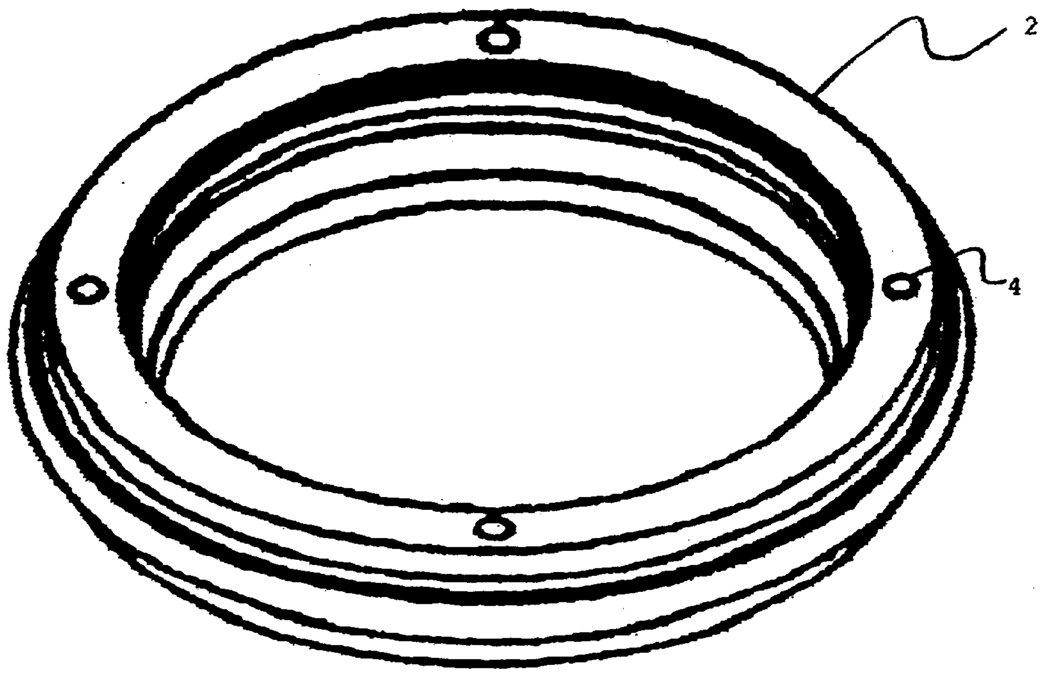
FIG. 3 is a top view of the first embodiment of the ion source insulator.

FIG. 2 is a side view of the same embodiment of ion source insulator 2, FIG. 3 is a top view of the same embodiment of the ion source insulator, showing that the polymer-tungsten-precursor composite of the invention may allow embodiments of the invention having additional features such as fastening hole 4. Such features may be produced by molding, inserts, machining, or other means suitable for use with polymer materials as are known in the art.

Figure 4:
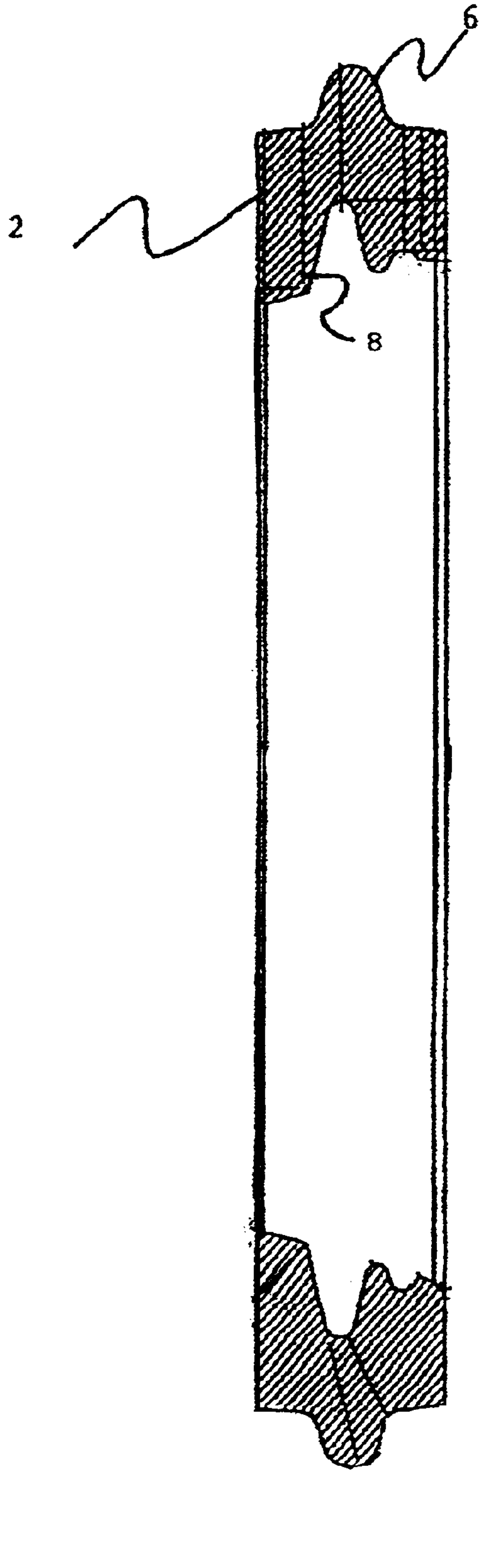
FIG. 4 is a cross-sectional view of the ion source insulator of FIG. 3, taken along section line A—A.

FIG. 4 is a cross-sectional view of the ion source insulator of FIG. 3, taken along section line A—A. Additional features include ridge 6 and circumferential groove 8. These features may be created "on demand" as requested by end users of the item: this demonstrates the versatility of the composite taught by the invention.

While the exemplary ion source insulator is quite simple, such devices may be complex, having a much greater depth, having a much greater thickness, having multiple grooves and ridges and so on. Items created using the composite of the present invention need not be annular nor even circular but may be any shape as required. The range of sizes in such insulators is quite large: from 1 inch to 20 or more inches tall, diameters from 6 to 40 inches, wall thicknesses which might be from ½ inch thick up to 3 inches thick and weights anywhere from under 1 pound to over 500 pounds.

As another example, X-ray shielding insulators are typically of an even wider range of shapes and sizes, cylinders, three dimensional conic sections, prisms, regular and irregular solids and composite shapes. A typical "box" might be irregular, 16 inches on a side and have a weight from 1 to 30 pounds. The thickness of the walls may be even greater than that of industrial ion source insulators.

In short, regardless of shape or size of the item to be made the present invention may be adapted to any radioactive/ion/gamma ray/x-ray shielding application without undue experimentation and without departing from the scope of the invention. Formulations other than those specifically provided may be employed without departing from the scope of the invention.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A radiation shield material comprising:

a. a polymer matrix and b. a tungsten-precursor within the polymer matrix, wherein the tungsten precursor comprises at least one member selected from the following group: ammonium paratungstate, ammonium metatungstate, and combinations thereof, in an approximate amount of at least 45% by volume.

2. The radiation shield material of claim 1, wherein the tungsten precursor further comprises blue tungsten oxide, yellow tungsten oxide and combinations thereof.

3. The radiation shield material of claim 1, wherein the tungsten precursor comprises tungsten oxide in an amount ranging from 80% to 99.9% of the total weight of the tungsten precursor.

4. The radiation shield material of claim 1, wherein the tungsten precursor comprises an amount by volume approximately ranging from 5% to 95%, preferably 10% to 55% of the total volume.

5. The radiation shield material of claim 1, wherein the polymer matrix comprises at least one member selected from the following group: thermosetting material, thermoplastic material and combinations thereof.

6. The radiation shield material of claim 1, wherein the polymer matrix comprises at least one member selected from the following group: epoxy, polyester, polyurethane, silicone rubber, bismaleimides, polyimides, vinylesters, urethane hybrids, polyurea elastomer, phenolics, cyanates, cellulose, flouro-olymer, ethylene inter-polymer alloy elastomer, ethylene vinyl acetate, nylon, polyetherimide, polyester elastomer, polyester sulfone, polyphenyl amide, polypropylene, polyvinylidene flouride, acrylic, homopolymers, acetates, copolymers, acrlonitrile-butadiene-stryene, flouropolymers, ionimers, polyamides, polyamide-imides, polyacrylates, polyether ketones, polyaryl-sulfones, polybenzimidazoles, polycarbonates, polybutylene, terephthalates, polyether sulfones, thermoplastic polyimides, thermoplastic polyurethanes, polyphenylene sulfides, polyethylene, polypropylene, polysulfones, polyvinylchlorides, stryrene acrylonitriles, polystyrenes, polyphenylene, ether blends, styrene maleic anhydrides, allyls, aminos, polyphenylene oxide, and combinations thereof.

7. The radiation shield material of claim 1, wherein the polymer matrix comprises epoxy resin is an approximate amount of 55% by volume.

8. The radiation shield material of claim 1, further comprising:

c) a third material.

9. The radiation shield material of claim 8, wherein the third material comprises at least one member selected from the following group: electrically insulating materials, binders, high density materials and combinations thereof.

10. The radiation shield material of claim 8, wherein the third material comprises at least one member selected from the following group: tungsten metal, calcium carbonate, hydrated alumina, tabular alumina, silica, glass beads, glass fibers, magnesium oxide, wollastonite, stainless steel fibers, copper, carbonyl iron, iron, molybdenum, nickel and combinations thereof.

11. The radiation shield material of claim 8, wherein the third material comprises an amount by volume approximately ranging from 5% to 95%, preferably 10% to 30% of the total composite volume.

12. A radiation shield material comprising:

a) a polymer matrix and b) a tungsten-precursor within the polymer matrix c) a third material wherein the polymer matrix comprises Novolac in an approximate amount of 64% of the total composite volume, and further wherein the tungsten precursor comprises blue tungsten oxide powder in an approximate amount of 16% by volume, and further wherein the third component comprises hydrated alumina in an approximate amount of 20% by volume.

13. An electrical insulator for an ion source, the insulator comprising:

a. a polymer matrix and b. a tungsten-precursor within the polymer matrix, wherein the tungsten precursor comprises at least one member selected from the following group: ammonium paratungstate, ammonium metatungstate, blue tungsten oxide, combinations thereof and combinations thereof with yellow tungsten oxide, the tungsten-precursor in an approximate amount of at least 45% by volume.

14. The electrical insulator of claim 13, wherein the body has a shape selected from the following group: generally annular bodies, generally cylindrical bodies, three dimensional conic sections, regular prisms, irregular prisms and combinations thereof.

15. A method of making a radiation shield comprising:

a) combining a tungsten precursor and a polymer into a composite wherein the tungsten precursor comprises at least one member selected from the following group: ammonium paratungstate, ammonium metatungstate, blue tungsten oxide, combinations thereof and combinations thereof with yellow tungsten oxide, in an approximate amount of at least 45% by volume; and b) forming the composite into a desired shape.

16. The method of claim 15, wherein the step of forming the composite into the desired shape further comprises one member selected from the following group: casting, molding, machining, extrusion, aggregation, liquid resin casting, injection molding, compression molding, transfer molding, pultrusion, centrifugal molding, calerendering, filament winding and combinations thereof.

* * * * *